Figure 1:
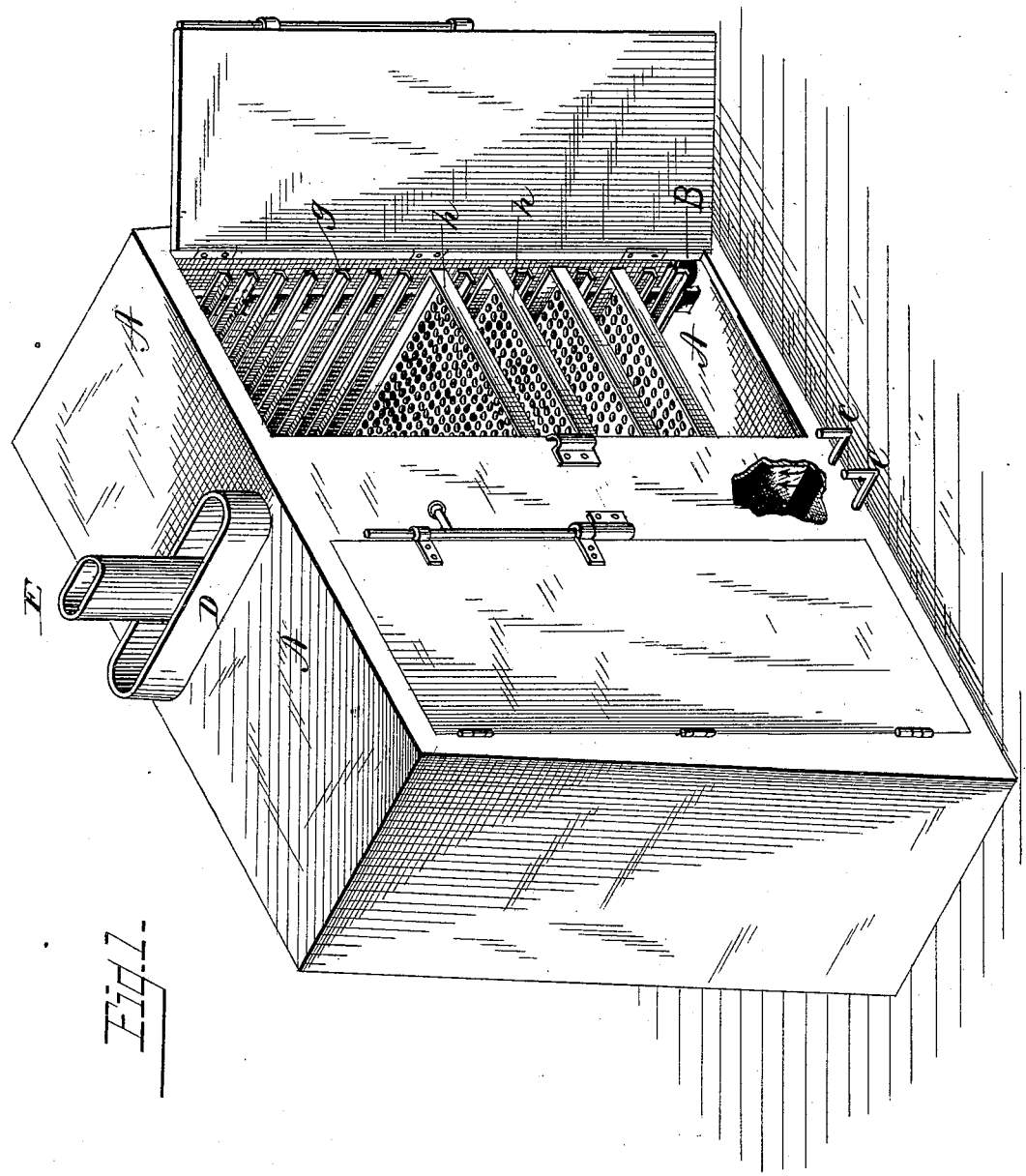

(No Model.) 3 Sheets—Sheet 1.

J. C. HENDERSON.
EVAPORATOR.

No. 266,148. Patented Oct. 17, 1882.

WITNESSES
Franck L. Ourand
W. C. Young.

INVENTOR
Joseph C. Henderson
by N. H. Doolittle
Attorney (No Model.) 3 Sheets—Sheet 2.
J. C. HENDERSON.
EVAPORATOR.
No. 266,148. Patented Oct. 17, 1882.
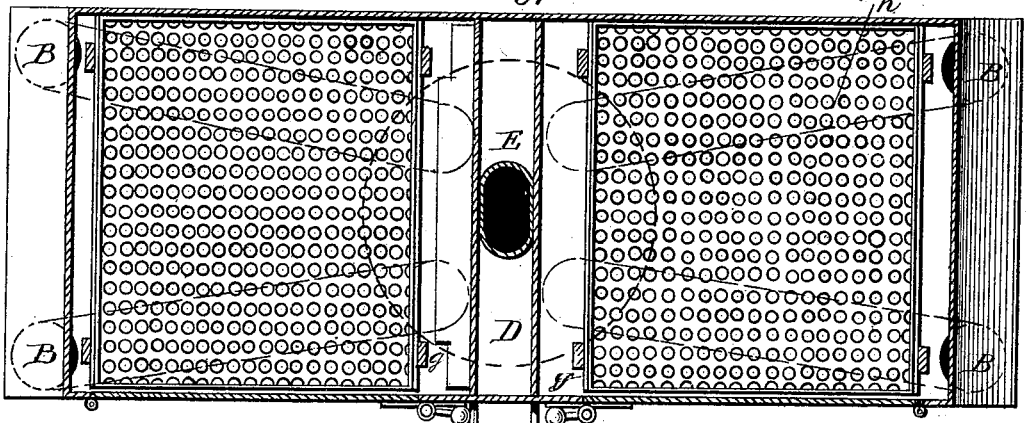
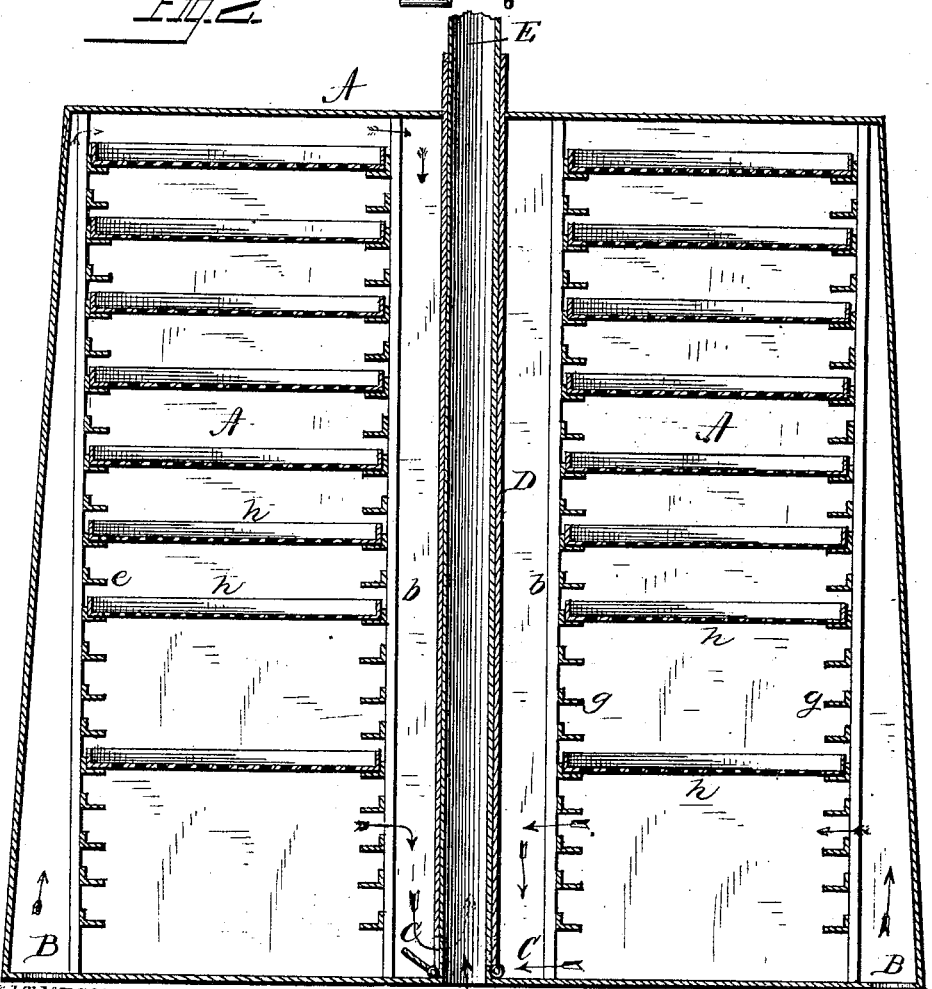
WITNESSES
INVENTOR (No Model.) 3 Sheets—Sheet 3.
J. C. HENDERSON.
EVAPORATOR.
No. 266,148. Patented Oct. 17, 1882.
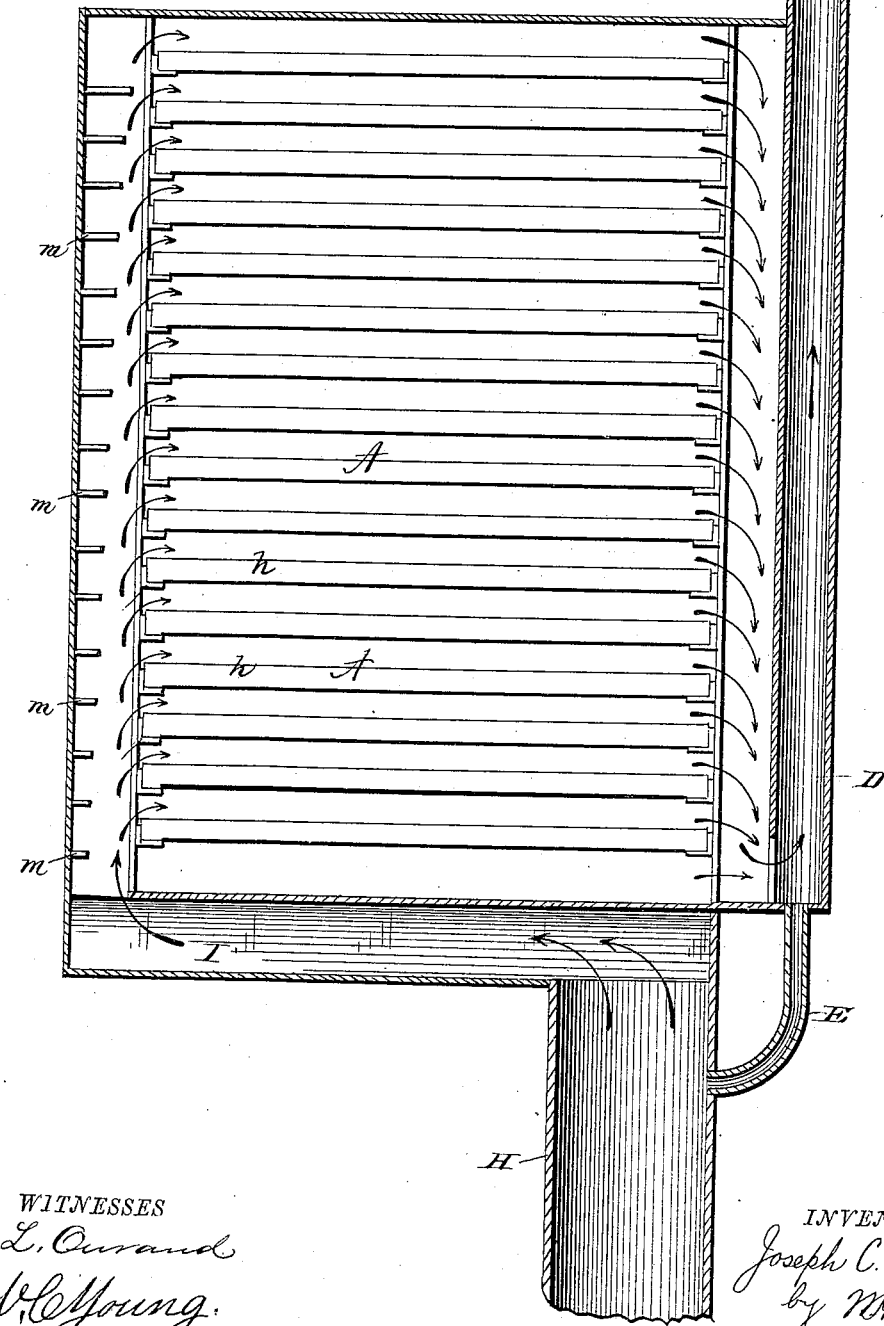
WITNESSES
F. L. Durand
W. C. Young.
INVENTOR
Joseph C. Henderson
by W. H. Doolittle
Attorney

UNITED STATES PATENT OFFICE.

JOSEPH C. HENDERSON, OF TROY, NEW YORK.

EVAPORATOR.

SPECIFICATION forming part of Letters Patent No. 266,148, dated October 17, 1882.

Application filed July 27, 1882. (No model.)

*To all whom it may concern:*

Be it known that I, JOSEPH C. HENDERSON, a citizen of the United States, residing at Troy, in the county of Rensselaer and State of New York, have invented certain new and useful Improvements in Evaporators; and I do hereby declare the following to be a full, clear, and exact description of the invention, such as will enable others skilled in the art to which it appertains to make and use the same.

The object of my invention is the construction of a simple, cheap, and efficient evaporator for drying fruit, vegetables, wood, clothes, and other substances by artificial heat, and by which a large amount of fresh, hot, dry air is continually brought in contact with the material to be dried, and which as fast as vapor is generated carries it off, without permitting the saturated air to be passed through from one layer to another, or to accumulate within the drying-chamber, thus producing a uniform dryness of the material throughout the chamber and greatly hastening the operation.

My improvements are illustrated in the accompanying drawings, in which Figure 1 is a perspective view of the evaporator; Fig. 2, a plan view of the same, showing in dotted lines the hot-air flues connected with the furnace; Fig. 3, a vertical sectional view, and Fig. 4 a vertical sectional view of a modification.

Like letters represent like parts in the several views.

The evaporator illustrated is provided with doors, which may have glass panels, and in one form is divided into two large chambers, A A, by two partitions, *b b*. Each of these chambers inclines inwardly toward the top for the purpose of better distributing the heat, as hereinafter described.

B B represent two hot-air flues proceeding from the furnace beneath the evaporator, and each leading into the separate chambers A A. The space D, formed between the chambers by partitions *b b*, constitutes an exhaust-flue, into which the hot air is conducted after it passes around the substances to be dried in chambers A A. The flow of air into the flue D is controlled by dampers C C at the bottom of the chambers.

Within the flue D, and extending up from the furnace, is located the smoke-pipe E. Both smoke-pipe and flue D extend above the roof of the evaporator and the smoke-pipe above the flue.

The flue may, above the roof, be provided with a ventilator (not shown) of any suitable form, as an aid in controlling the circulation of hot air within the evaporator.

Within each of the chambers A A are arranged a series of supports, *g*, and sieve-like movable trays *h*. The shelves, which are simply wide enough to support the sides of the trays, are shown as rigidly connected to four upright posts in each chamber and arranged at certain distances apart; but they may, if desired, be connected to the posts by means of pegs and holes or other means, so as to be removed from the chamber, or to permit the distances between the supports to be varied. It will be seen that an open space is left between each support as well as tray, which forms a sort of horizontal cross-flue for the passage of hot air from one side of the chamber between the trays to its opposite side, where it is carried down and into the exhaust-flue. Both sides of the chamber, when the trays are filled, act as flues, one having an upward and the other a downward draft. The trays are made with their edges turned up on all sides to permit them to be easily slid in and out.

The furnace is located below the floor of the room in which the evaporator is placed.

The operation of the apparatus is as follows: After the fruit or other substance to be dried is placed on the trays the dampers at the bottom of the chambers are closed and the fire in the furnace is started. The heat ascends the flue B, and when the temperature in the chambers is at a proper height the dampers are opened. The heat now flows, as indicated by the arrows, up the outer side of the chamber between each tray, and out between the supports to the opposite side of the chamber, where it is carried down and through the openings into the exhaust-chamber, up through which it escapes. The hot air having a tendency to rise at once to the top of the chambers, the side walls of the same are inclined inwardly, so as to contract the space at the top and to conduct or throw the heat forward to the trays. The draft is so regulated that the saturated hot air is carried off at once down the opposite side of the chamber, which by the construction of the apparatus is thus made a flue for that purpose, and out into the exhaust-flue, while its place is supplied by a fresh supply of hot dry air. By this method the system now followed with driers most in use, of passing the hot air up or down through one layer after another, or allowing it to remain in the drying-chamber after it becomes saturated with vapor, is entirely obviated, and instead a circulation of dry hot air over the fruit or other material is constantly maintained. Thus the operation of drying is not only more quickly performed, but the fruit is more thoroughly and uniformly dried and left with all its natural elements intact, and in the very best condition in which it can be preserved. Should it be found necessary to still further equalize the heat throughout the chambers, suitable deflectors, $m$, may be arranged within the top of the chambers to throw the heat downward or obstruct its upward flow. These deflectors may be used with or as an equivalent of the inclined walls. The flow of heat into the chambers may also be further controlled by setting the dampers in the flues D at proper angles, or it may by the same means be shut off altogether. A little experience will soon indicate the management of these dampers and those leading into the exhaust-flue to attain proper results. The doors of the respective chambers are to be kept closed during the operation to prevent egress of air, and the process can be watched, if desired, through glass panels formed in the doors. The smoke-pipe running up through the exhaust-flue, by warming the air in said flue, greatly aids the draft and helps to maintain the proper temperature within the chamber in all kinds of weather. These evaporators do not therefore require a brick chimney constructed for the furnace-pipe, and the heat is utilized for ventilation and made to assist in carrying off the steam or vapor from the drying fruit.

In the drawings the evaporator is a double one having two chambers side by side; but it can be made with a single chamber just as well, if desired, and where a small amount of fruit, &c., is to be dried. In Fig. 4 a modification of the evaporator for this purpose is shown. The heater H is located below the floor on which the evaporator is supported, from whence heat is conducted through pipe I into the side chamber, A, which chamber has straight walls, and is then deflected horizontally between the trays by deflectors $m$, which are here made the equivalent of the inclined walls. The heat is led down the opposite side of the chamber and up through the exhaust-pipe. The smoke-pipe E leads into the exhaust-pipe D. Dampers are not shown in this view, and they may be used or not, as desired. The great advantage of making the evaporator double, however, especially when a large amount of material is to be dried, is that the chambers can be used alternately—that is, when the fruit, for instance, in one chamber is sufficiently dried the heat can be turned off from that chamber and into the other while the dried fruit in the former one is being removed and fresh material put in. The chambers are thus used without waste of heat or loss of time.

As stated at the outset, other substances than fruit may be dried in this apparatus. In drying some materials, however, like lumber, where the trays are not used, it may be desirable to carry the hot air directly to the top of the chamber, which can be done by extending the flues B upward, and as fast as the air becomes saturated it falls to the bottom of the chamber and is drawn off through the exhaust-flue.

Having thus described my invention, what I claim, and desire to secure by Letters Patent, is—

1. An evaporating apparatus comprising a double drying-chamber with upwardly-inclined side walls or deflectors, in combination with the hot-air flues, and an exhaust-flue located between the drying-chambers, suitable dampers, and a smoke-flue extending up through said exhaust-flue, substantially as herein described.

2. In an evaporating apparatus, the drying-chamber A, constructed with an inclined wall or equivalent deflector, in combination with a heater provided with a pipe or flue carrying the heat up and into one side of the said chamber, the horizontal trays between which the heat is conducted, the exhaust-flue and the smoke-pipe extending from the heater into said flue, and both located on the side of chamber A opposite to the side in which the heat is introduced, substantially as described.

In testimony whereof I affix my signature in presence of two witnesses.

JOSEPH C. HENDERSON.

Witnesses:
CHAUNCEY O. GREENE,
JAMES A. HENDERSON.